W. H. KELLY & A. TSCHINKEL.
TURBINE.
APPLICATION FILED DEC. 5, 1907.
909,191.
Patented Jan. 12, 1909.
2 SHEETS—SHEET 1.
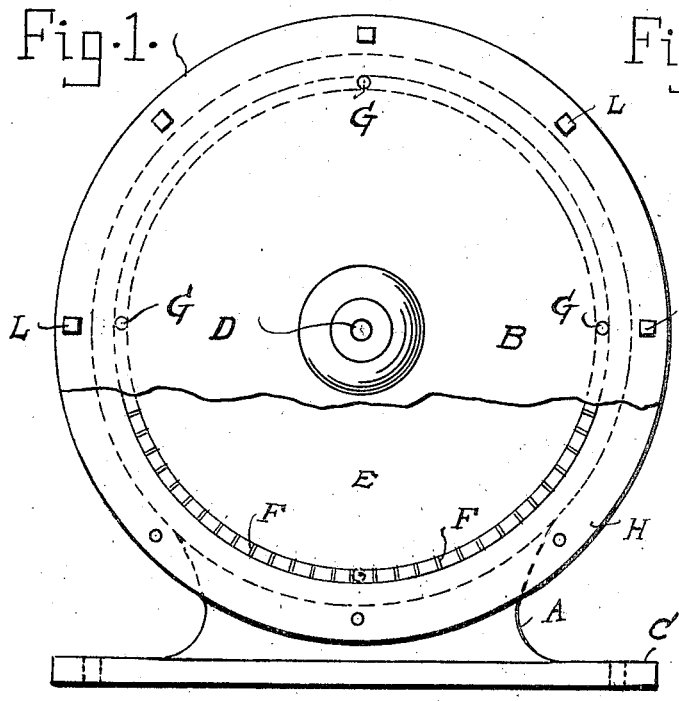
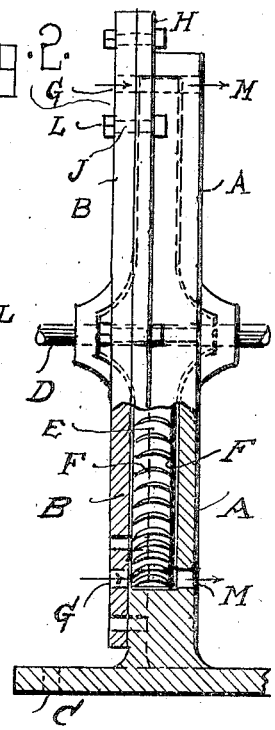
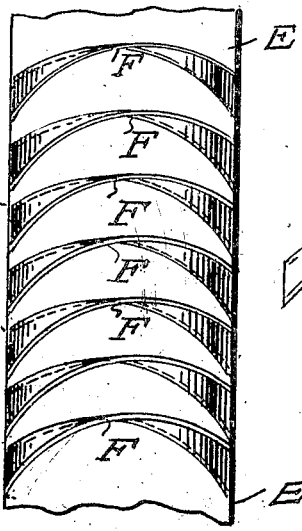
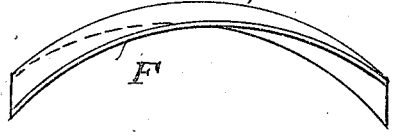
WITNESS:
INVENTORS W. H. KELLY & A. TSCHINKEL.
TURBINE.
APPLICATION FILED DEC. 5, 1907.
909,191.
Patented Jan. 12, 1909.
2 SHEETS—SHEET 2.
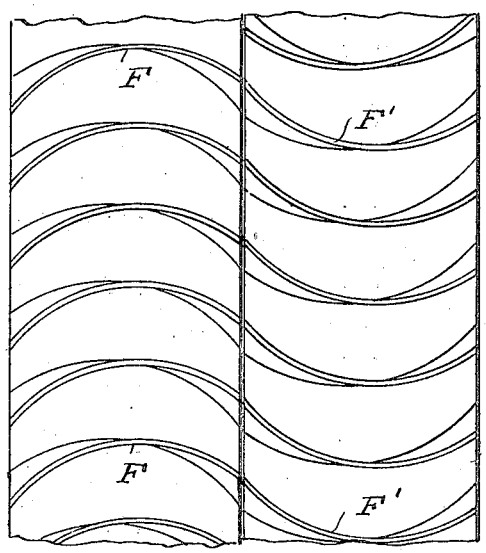
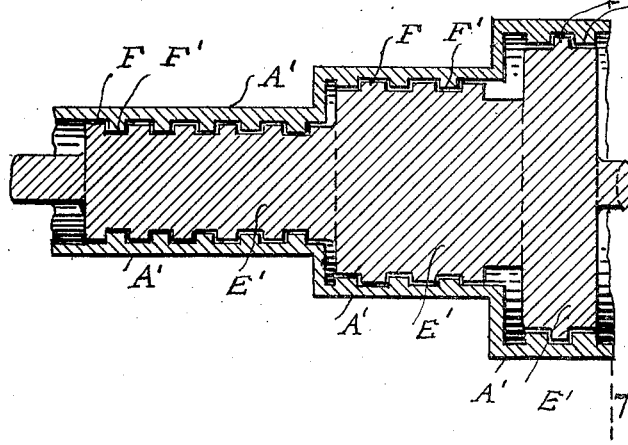
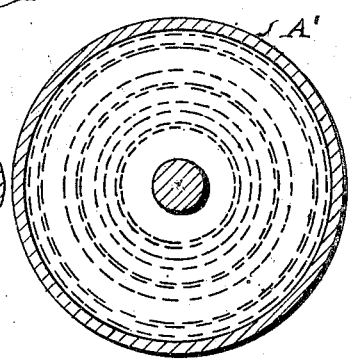
WITNESSES
INVENTORS

UNITED STATES PATENT OFFICE.

WILLIAM H. KELLY AND ALFRED TSCHINKEL, OF NEW YORK, N. Y.

TURBINE.

No. 909,191.	Specification of Letters Patent.	Patented Jan. 12, 1909.

Application filed December 5, 1907. Serial No. 405,293.

*To all whom it may concern:*

Be it known that we, WILLIAM H. KELLY and ALFRED TSCHINKEL, citizens of the United States, residing at New York, county and State of New York, have invented new and useful Improvements in Turbine - Engines, of which the following is a specification.

Our invention relates to turbine engines. It has for its object to provide a turbine engine embodying a stationary casing a rotatable wheel having one or more lines of buckets on its outer circumference, one or multiple steam inlets and outlets communicating with said buckets. The number of lines of buckets is governed by the degree of expansion, the peripheral velocity which is desirable or practicable, and by various conditions of mechanical expediency. We attain this object by the mechanism illustrated in the accompanying drawing in which:

Figure 1. is a front elevation of a turbine engine, showing a part of a turbine wheel, the casing and its cover. Fig. 2. is a side elevation of a turbine engine, a part of the casing being broken away to show the steam buckets. Fig. 3. is a diagrammatic view showing the buckets on the wheel. Fig. 4. is a view a of a bucket. Fig. 5. is diagrammatic view, showing the relation between the buckets in the casing and the buckets on the wheel. Fig. 6. is a longitudinal section of a turbine engine consisting of internal revolving drums and external stationary cylinders, which inclose them. Fig. 7. is a cross section on line 7, 7 in Fig. 6.

Similar letters refer to similar parts throughout the several views.

Referring to the drawings: Our single line turbine engine as shown in Figs. 1 and 2 consists of a casing A, having a peripheral flange H, a base C, a front cover B fitted to said casing A and secured thereto by means of bolts J and nuts L. Steam inlets G G and outlets M M are located as shown. The turbine wheel E is mounted within the casing A and the cover B upon a shaft D, journaled in bearings in said casing and cover. The outer circumference or periphery of said wheel is provided with a continuous line of transversely curved buckets F having its inner or inner and outer faces propeller shaped. Each bucket is curved arc-like longitudinally and is of concavo-convex contour having its ends turned in opposite directions and having its body twisted longitudinally providing a screw-like conformation.

In our new turbine engine shown in Figs. 6 and 7, the steam is carried in an axial direction through the space provided between a succession of internal revolving drums E', E' and external stationary cylinders A', which inclose them. Both the internal and the external cylindrical surfaces are covered by many successive circles of buckets F—F' so arranged that the steam has to pass alternately between rows of moving and stationary buckets. The buckets on the moving element are placed alternately with reversed buckets on the stationary element. The buckets on the moving and stationary element have their inner or inner and outer faces propeller shaped as shown in Figs. 3—5 and 4.

In Fig. 5. is shown a part of a line of propeller shaped buckets located on the moving element and its position toward a part of a line of reversed propeller shaped buckets on the stationary element.

What we do claim as our invention and desire to secure by Letters Patent is:

1. In a turbine engine, a casing having inlets and outlets, a wheel in said casing and a series of buckets on said wheel each bucket being curved longitudinally, having its ends turned in opposite directions and having its body twisted longitudinally to provide a screw-like conformation.

2. In a turbine engine, a stationary casing, a circular series of buckets arranged on the circumference of said casing, a rotatable wheel in said casing having a series of buckets on its periphery each of said buckets being formed arc-like longitudinally and having their ends turned in opposite directions to impart a twist to the body or center of the buckets whereby said buckets have a screw-like conformation, one end of the buckets of the casing being disposed adjacent to and in alinement with one of the ends of the wheel buckets.

In testimony whereof, we have signed our names to this specification in the presence of two subscribing witnesses, this the third day of December 1907.

WILLIAM H. KELLY.
ALFRED TSCHINKEL.

Witnesses:
WILLIAM M. CARD,
THOMAS F. GARRITY.